United States Patent
Wysk et al.

(10) Patent No.: US 6,949,851 B2
(45) Date of Patent: Sep. 27, 2005

(54) MOTOR HOUSING FOR AN ELECTRIC MOTOR

(75) Inventors: Hans-Joachim Wysk, Villingen-Schwenningen (DE); Helmut Ganter, Bad Dürrheim (DE)

(73) Assignee: Minebea Co., Ltd., Nagano-ken (JP)

( * ) Notice: Subject to any disclaimer, the term of this patent is extended or adjusted under 35 U.S.C. 154(b) by 39 days.

(21) Appl. No.: 10/757,409

(22) Filed: Jan. 15, 2004

(65) Prior Publication Data

US 2004/0145259 A1 Jul. 29, 2004

(30) Foreign Application Priority Data

Jan. 21, 2003 (DE) .......................................... 103 02 130

(51) Int. Cl.[7] .............................................. H02K 5/00
(52) U.S. Cl. .......................................... 310/89; 310/88
(58) Field of Search .................................... 310/88–89

(56) References Cited

U.S. PATENT DOCUMENTS 3,777,194 A   12/1973   Schaefer et al.
5,215,312 A   6/1993    Knappe et al.
5,796,197 A   8/1998    Bookout
5,894,180 A * 4/1999    Volz et al. ..................... 310/89

FOREIGN PATENT DOCUMENTS

| DE | 3635297  | 3/1993 |
| DE | 4444643  | 6/1996 |
| DE | 19548471 | 5/1997 |
| DE | 19635180 | 5/1998 |

OTHER PUBLICATIONS

European Patent Office Search Report for EP03029346 Nov. 6, 2004.

* cited by examiner

Primary Examiner—Thanh Lam
(74) Attorney, Agent, or Firm—Duane Morris LLP

(57) ABSTRACT

A motor housing for an electric motor having a housing shell which encloses a space to accommodate the electric motor, and a flexible partition in the housing shell which separates a pressure equalizing cavity from the cavity accommodating the electric motor, whereby the pressure equalizing cavity is connected to the outside environment.

28 Claims, 3 Drawing Sheets

MOTOR HOUSING FOR AN ELECTRIC MOTOR

Figure 1:
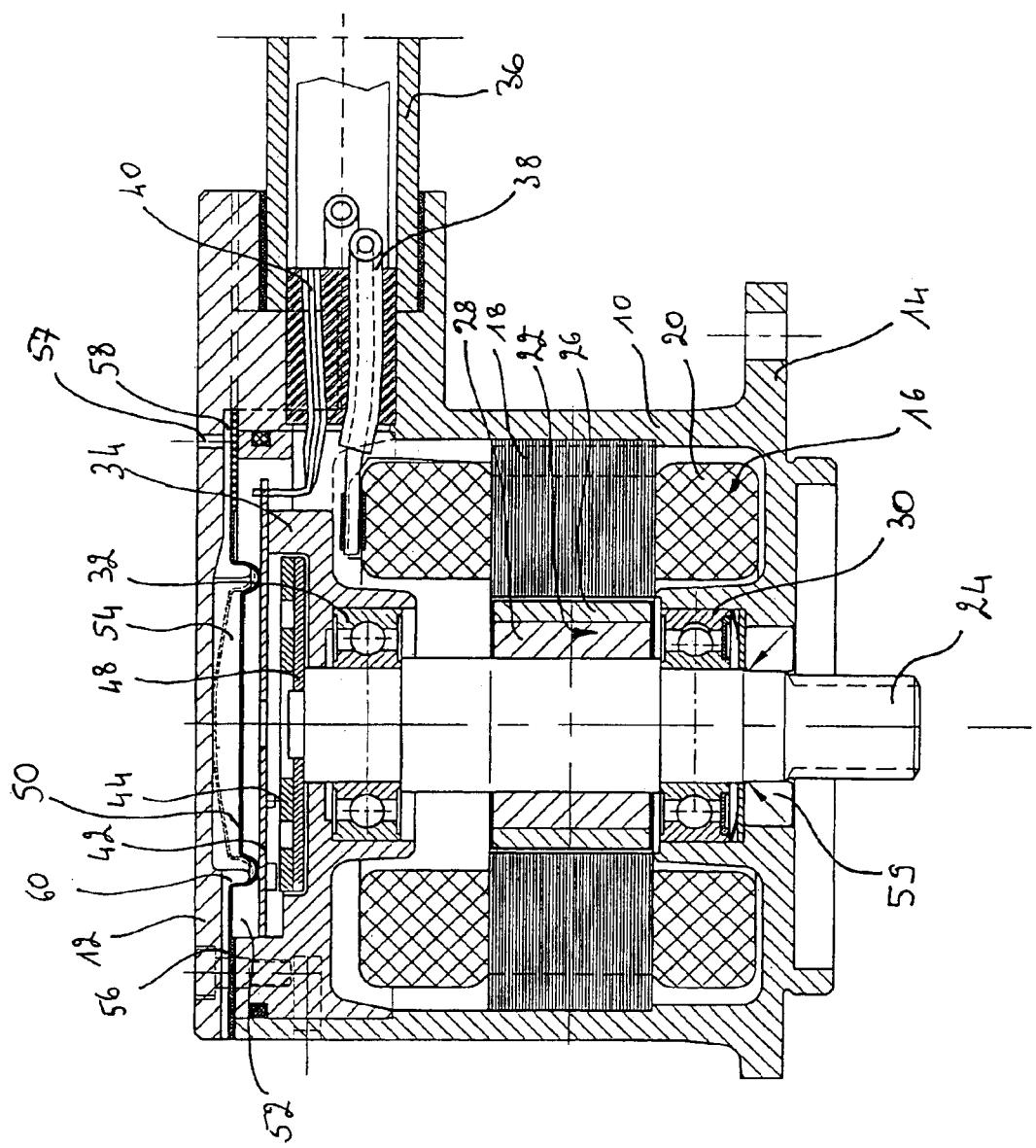

This application claims priority to the filing date of German Patent Application No. 103 02 130.2 filed Jan. 21, 2003, the specification of which is incorporated herein in its entirety.

FIELD OF THE INVENTION

The invention relates to a motor housing for an electric motor as well as an electric motor which is enclosed by such a motor housing.

BACKGROUND OF THE INVENTION

The invention relates to electric motors in general and, in particular, to direct current motors which can be configured as either inner rotor motors or outer rotor motors. Even more specifically, the motor could be an electronically commutated, brushless DC motor or any other permanent magnet motor. Such motors include a rotor assembly which is connected to a shaft and has one or more permanent magnets, as well as a stator assembly which includes a stator, composed, for example, of laminations, and phase windings. Two bearings are arranged on the shaft at an axial distance from each other in order to support the rotor assembly relative to the stator assembly. As a rule, such motors also have a sensor device to register the rotational position, the rpm and/or the torque of the rotor assembly relative to the stator assembly. The sensor device can, for example, include a position sensor.

The electric motor presented in the invention is particularly intended for application in the automobile sector, for example, to support the steering, to drive a cooling water pump arranged separately from the engine of a vehicle or as a gear shift motor. Such motors frequently find application in the internal-combustion engine compartment of a vehicle where they are subjected to high temperatures and extreme temperature changes. Particularly in all-terrain vehicles which make special demands on the motor such as its fording ability (ability to be immersed in water), the changes in temperature to which the electric motor is subjected can be very high. At the same time, care has to be taken that no water or any other type of pollutant can penetrate into the motor. This means that these motors have to be protected against such outside influences and be of a robust construction, and at the same time they have to be able to withstand extreme changes in temperature.

An electric motor with a fully closed design is known from DE 36 35 297 which is cooled by a fluid circulating in the closed housing, whereby pressure equalizing devices are provided in the motor to equalize the volume or pressure of the coolant.

An electric motor is known from DE 44 44 643 in which a pressure equalizing device takes the form of a PTFE membrane which is arranged in a connecting channel between the interior of the electric motor and the outside air. The pressure is equalized by an exchange of air, whereby the membrane prevents moisture from penetrating into the interior of the motor housing.

One object of the invention is to provide a motor housing for an electric motor which guarantees optimal functionality of the motor even during extreme changes in temperature.

SUMMARY OF THE INVENTION

This object has been achieved by a motor housing having the characteristics outlined in claim 1.

The invention provides a motor housing for an electric motor having a housing shell which encloses a space to accommodate the electric motor and a flexible partition in the housing shell which separates a pressure equalizing cavity from the cavity accommodating the electric motor. The pressure equalizing cavity is connected to the outside environment. The flexible partition is preferably formed from a membrane. In a particularly preferred embodiment of the invention, the housing shell is sealed by a housing cover, whereby the flexible partition is inserted between the housing shell and the housing cover.

The invention thus creates a motor housing which is divided into two cavities by means of the flexible partition, whereby the motor is accommodated in one cavity and the other cavity forms a pressure equalizing volume which is connected to the outside atmosphere. The cavity accommodating the motor is sealed off from the outside atmosphere by the flexible partition. Through the motor construction presented in the invention, a pressure equalizing volume is created which can equalize the pressure in the motor housing when the electric motor undergoes extreme changes in temperature.

The cavity accommodating the electric motor is hermetically sealed to a large extent against the outside environment. When the motor warms up during operation, the air inside the motor housing expands and creates excess pressure in the cavity accommodating the electric motor. This excess pressure can be compensated by the flexible partition being deflected in the direction of the pressure equalizing cavity so that the volume of the pressure equalizing cavity decreases and the volume of the cavity accommodating the electric motor increases. When the pressure equalizing cavity is connected to the outside environment, the medium held in the pressure equalizing cavity can escape. By these means, the pressure in the cavity accommodating the electric motor is equalized.

As mentioned above, the motor housing of the present invention is intended for electric motors in the automobile sector and, in particular, for all-terrain vehicles, particularly all-terrain vehicles with four-wheel drive, such as pickup trucks. The invention is also particularly well suited for vehicles with boat trailers which are designed to be driven backwards into water, or for other sports utility vehicles. If, for example, such a vehicle is driven through water and the electric motor is thus immersed in water, it is abruptly cooled from a very high operating temperature down to the water temperature as a result of which low pressure is created in the motor. To avoid water being sucked into the motor cavity through the bearings or any other non-tight areas in the motor as a result of this low pressure, the invention provides for the low pressure to be equalized by means of the pressure equalizing volume.

In particular, the flexible partition can be deflected in the direction of the cavity accommodating the electric motor to reduce the volume of this cavity and thus to achieve an equalization of the pressure. The pressure equalizing volume is increased to the same extent as the volume of the cavity accommodating the electric motor is decreased. Since the pressure equalizing cavity is connected to the outside environment, air and liquid can enter the pressure equalizing cavity during this process but not the cavity accommodating the electric motor, which is separated off by the flexible partition.

When the motor warms up again during continued operation, the pressure in the cavity accommodating the electric motor gradually increases again and presses against the flexible partition, so that the pressure equalizing volume decreases again. In this process, any possible air and water contained in the pressure equalizing cavity is pressed out of this cavity. Water can also flow out of the pressure equalizing cavity through the force of gravity. By arranging the channels and holes connecting the pressure equalizing cavity to the outside environment suitably at different heights, this flow off can be supported by gravity.

According to the invention, the flexible partition is preferably formed like a membrane. It could be made of an elastomer. Suitable materials for the manufacture of the membrane are, for example, nitrile butadiene rubber (NBR); ethylene propylene diene rubber (EPDM); fluor rubber (FKM). Semi-permeable materials can also be used as a raw material for the membrane provided they have sufficient resistance and can withstand high temperatures. Materials from the textile industry might also be suitable such as Gore-Text™.

The flexible partition or membrane has several functions. For one, it allows the volume of the cavity accommodating the electric motor and the volume of the pressure equalizing cavity in the motor housing to be varied depending on the pressure situation in the motor in order to achieve pressure equalization in the motor. On the other hand, the flexible partition ensures that the motor cavity is hermetically sealed against the pressure equalizing cavity which is open to the outside environment. This goes to ensure that any liquid entering into the pressure equalizing cavity and any other pollutants do not penetrate into the motor compartment. In using a semi-permeable material, the flexible partition can be designed in such a way that although liquid can enter the pressure equalizing cavity from the cavity accommodating the electric motor, it cannot flow in the opposite direction.

In a preferred embodiment of the invention, the flexible partition is clamped between the housing shell and the housing cover and forms a seal between them. The flexible partition thus takes on the additional function of sealing the inner cavity of the motor housing.

The pressure equalizing cavity is preferably formed between the housing cover and the flexible partition. To establish a connection to the outside environment, at least one opening, preferably two openings, are formed in the housing cover. The openings can be formed by grooves, holes or in any other form. The openings are preferably formed in such a way that no solids can penetrate into the pressure equalizing cavity. For this purpose, labyrinth-like openings or a covered hole or groove can be provided.

In a preferred embodiment of the invention the housing cover features some means of fixing the flexible partition in position when the partition is distorted. This means can include, for example, bridges, ribs or posts.

In another preferred embodiment of the invention a cable duct is provided between the housing shell and the housing cover which holds leads for the purpose of connecting the electric motor. Here, the flexible partition can be formed as one piece with a seal between the cable duct and the housing shell and/or between the cable duct and the housing cover.

The invention also provides an electric motor having a stator and a rotor which is enclosed in a motor housing of the type described above.

SHORT DESCRIPTION OF DRAWINGS

Figure 2:
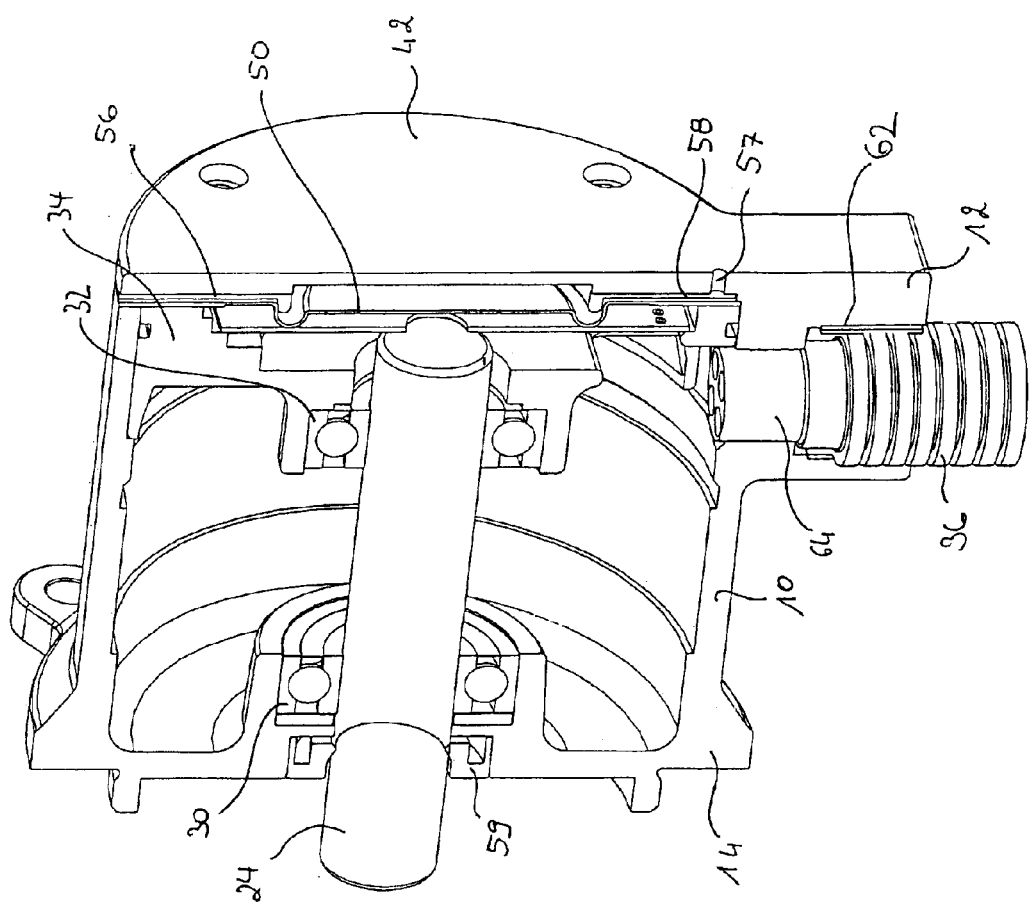
Figure 3:
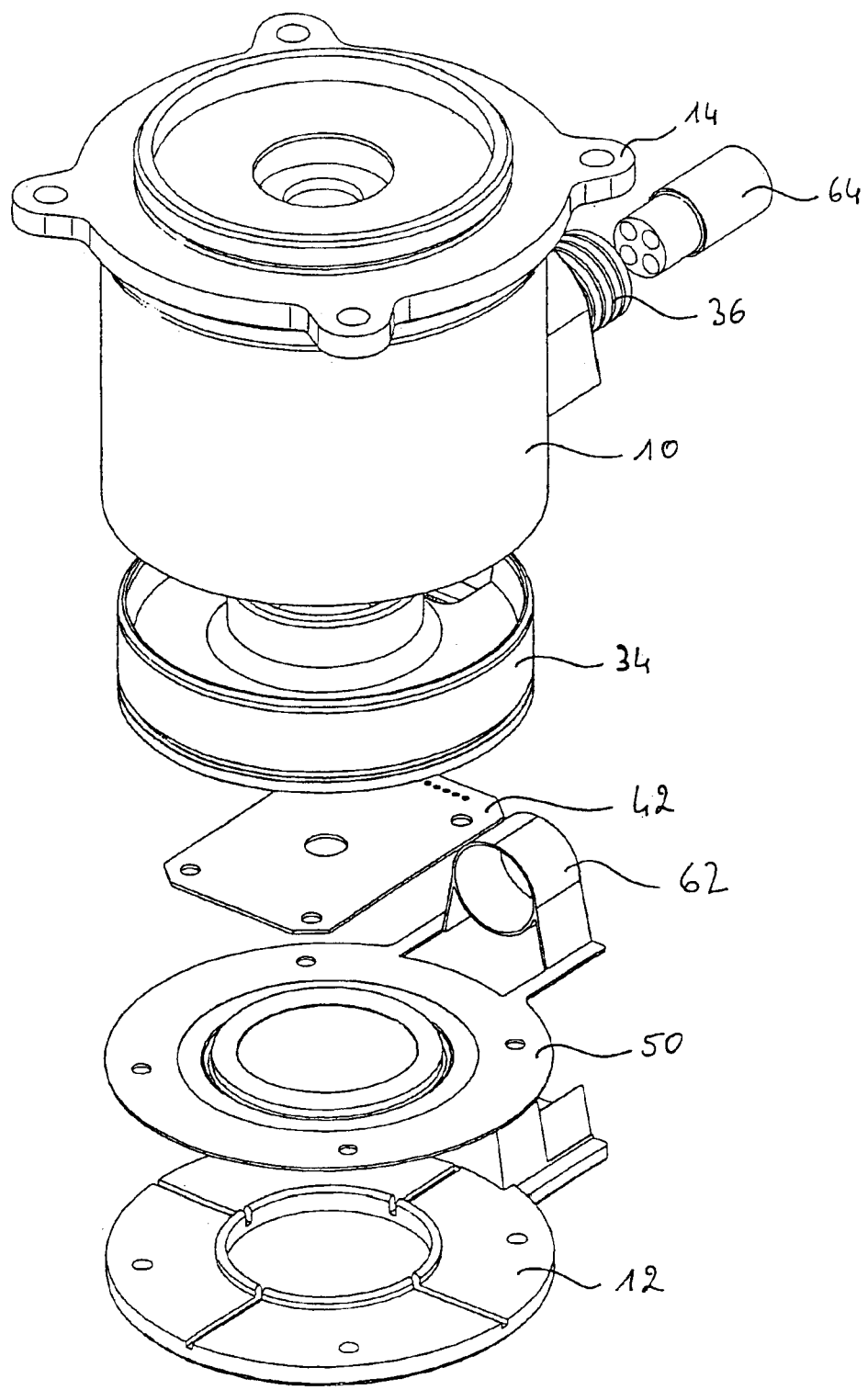

The invention is described in more detail below with reference to the drawings. The figures show:

FIG. 1 a cross-section through an electric motor having a motor housing in accordance with the invention;

FIG. 2 a perspective cross-sectional view of a motor housing in accordance with the invention; and FIG. 3 a perspective exploded view of a motor housing in accordance with the invention.

DETAILED DESCRIPTION OF PREFERRED EMBODIMENT

FIG. 1 shows a cross-section through an electric motor having a motor housing in accordance with the invention. The electric motor is preferably a brushless direct current motor or any other permanent magnet motor.

The electric motor shown in FIG. 1 has a housing shell 10 and a housing cover 12. A flange 14 to attach the motor, for example, in a motor vehicle is formed onto the housing shell 10. This flange 14 is also referred to as an A-flange. The housing shell 10 has a basically cylindrical shape and is immovably connected to a stator 16 which includes a stator body 18 formed, for example, from lamentations, and phase windings 20. A rotor 22 is immovably connected to a shaft 24 and rotates in relation to the housing shell 10 and the stator 16. The rotor 22 includes a rotor magnet 26 and a back iron yoke 28. The rotor 22 and the shaft 24 are supported in the housing shell 10 via two roller bearings 30, 32. In the embodiment illustrated, the roller bearings 30, 32 are ball bearings, whereby the first ball bearing 30 is integrated in the flange 14 of the housing shell 10 and a second ball bearing 32 is supported on the housing shell 10 via another flange 34, which is also referred to as a B-flange. The essentially cylindrical housing shell 10 of the motor housing extends from the A-flange 14 to the B-flange 34 and is sealed by the housing cover 12.

A cable duct 36 is provided between the housing shell 10 and the housing cover 12 which holds leads 38, 40 for the purpose of connecting the electric motor. Moreover, a sensor PCB 42 is attached to the B-flange 34 which is allocated a signal producing device 44 that is attached to the shaft 24 via a supporting component 48. In the illustrated embodiment, the signal producing device 44 can feature magnetic tracks, for example, which lie opposite a position sensor on the sensor PCB 42. Connection leads 40 for the sensors are led to the outside through the cable duct 36 as are the connection leads 38 for the phase windings 20.

A membrane 50 is inserted between the housing cover 12 and the housing shell 10 which separates a cavity 52 accommodating the electric motor from a pressure equalizing cavity 54 in the interior of the motor housing. Whereas the cavity 52 accommodating the electric motor is sealed to a large extent from the outside environment by the housing shell 10, the bearings 30, 32, the B-flange 34 and the membrane 50, the pressure equalizing cavity 54 is open to the outside environment. For this purpose, several (preferably at least two) grooves 56, 58 or holes are formed in the housing cover 12 which go to connect the equalizing cavity 54 to the outside environment. The membrane 50 not only separates the cavity 52 accommodating the electric motor from the pressure equalizing cavity 54, but also forms a seal at the contact surfaces of housing shell 10, B-flange 34 and housing cover 12 between these contact surfaces which prevents any liquid or any other foreign bodies from penetrating into the cavity 52 accommodating the electric motor. The membrane can be formed from an elastomer or any other impermeable or semi-permeable material, whereby this material must be so composed that no liquid, air or any other media can enter the cavity 52 accommodating the electric motor from the pressure equalizing cavity 54. As shown in FIG. 1, projections, bridges, ribs 60 or any other means of fixing the position of or guiding the membrane 50 during its deflection can be provided on the housing cover 12.

The cable duct 36 can be formed as a corrugated pipe or any other known cable conduit. The cable duct 36 is preferably sealed towards the housing cover 12 and the housing shell 10 by means of a seal which is formed as one piece with the membrane 50 as a side extension of this membrane. Alternatively, the seal of the cable duct 36 is made of the same material as the membrane 50 but formed as a separate component. Other seals known from the prior art may also be used as seals.

As mentioned above, the membrane 50 is used to separate the cavity 52 accommodating the electric motor from the pressure equalizing cavity 54 within the motor housing. Whereas the cavity 52 accommodating the electric motor is sealed at the power take-off side towards the engine gear box against the intrusion of transmission oil by means of a radial shaft seal 59, the pressure equalizing cavity 54 is open to the outside environment via the grooves 56, 58 as well as a hole 57. Since the cavity 52 accommodating the electric motor cannot be fully sealed against the outside environment, particularly in the situation where the motor is immersed in water, there is a risk of water being sucked into the inner cavity of the motor 52 on sudden changes in pressure within the motor due to abrupt changes in temperature. To prevent this, the invention creates the pressure equalizing cavity 54, by inserting the membrane 50, which equalizes excessive low pressure and also excess pressure in the motor cavity 52.

In practice, electric motors which are used as gear shift motors, power steering motors, pump motors or such like in all-terrain vehicles can be subjected to sudden changes in temperature of 30% to 40%. For example, if the motor operating temperature is 398 Kelvin and the electric motor is immersed in ice water with a temperature of 278 Kelvin, there is a change of pressure according to the following equation:

$$P1/P2 = T1/T2 \approx 0.70$$

which, with a constant volume, represents a pressure drop of about 30%. To equalize this pressure drop in the inner cavity of a motor 52 when the motor is very suddenly cooled, the inner cavity of the motor 52 has to be decreased accordingly and thus the pressure equalizing volume 54 increased accordingly. Since the pressure equalizing volume 54 is connected to the outside environment, pressure equalization to the outside environment can readily be effected in that air and/or water is sucked via the grooves 56, 58 into the pressure equalizing cavity 54 which then expands. An appropriate arrangement of the grooves 56, 58 on the motor housing can ensure that any water sucked in can flow out again after the pressure has been equalized and the vehicle has driven out of the water.

Depending on the application and dimensioning of the electric motor, the membrane 50 may be placed at a different position to provide a relatively larger pressure equalizing volume 54. It may also be formed in a different way to that in the illustrated embodiment.

A particular advantage of the invention lies in the fact that the membrane 50 not only effects the separation between motor cavity 52 and pressure equalizing cavity 54 but also takes on a sealing function to seal the housing cover 12 on the housing shell 10 and the B-flange 34. In addition, the membrane 50 can also seal the cable duct 36 and form a lead cleat for the cable duct.

FIG. 2 and 3 show a cross-sectional perspective view and a perspective exploded view of the motor housing presented in the invention to illustrate the motor housing more clearly. As shown in these figures, the motor housing includes a housing shell 10 onto which the A-flange 14 is formed. The B-flange 34 is set into the housing shell 10 at the opposite end. It supports a sensor PCB 42. The housing is sealed by the housing cover 12, whereby the membrane 50 separates the pressure equalizing cavity between membrane 50 and housing cover 12 from the motor cavity between membrane 50 and housing shell 10.

Moreover, a sealing ring 62 is formed onto the membrane 50 which seals the cable duct 36 in relation to the housing shell 10 and the housing cover 12. In the illustrated embodiment, the cable duct 36 is formed from a corrugated pipe in which an elastic stuffing box 64 is set which is used to fix and seal cables and leads to connect the electric motor. The membrane 50 and the sealing ring 62 form a tight connection between housing cover 12 and housing shell 10 and at the same time form a lead cleat for the cable duct 36. This creates a cylindrical, positive-fit lead cleat for the cable duct and allows its simple and safe assembly. In particular, it also enables the pre-assembly of the cables and leads required for the electric motor, including edge connectors, cable lugs and such like without these having to be individually fed through a hole in the motor housing or a screwed cable gland.

The other characteristics and functions of the motor housing of the present invention are the same as described in reference to FIG. 1.

The electric motor presented in the invention is preferably used as an auxiliary motor for power steering support, a coolant pump, a gear shift device or such like in motor vehicles, particularly in all-terrain vehicles in which such motors are subjected to extreme changes in temperature and adverse environmental conditions.

The membrane 50 of the present invention which separates the motor cavity 52 from the pressure equalizing cavity 54 is made of an elastic material, such as an elastomer, e.g. NBR, EPDM, FKM, or a semi-permeable material that must, however, show sufficient resistance under high pressures and temperatures. It is also conceivable that a PTFE membrane or a membrane from a similar material is used. The membrane ensures that the motor cavity is sealed and that no foreign bodies and, in particular, liquids can penetrate into the motor. If a semi-permeable material is used, however, liquid can enter the pressure equalizing cavity 54 from the motor cavity 52.

The characteristics revealed in the above description, the claims and the figures can be important for the realization of the invention in its various embodiments both individually and in any combination whatsoever.

Identification Reference List

10 Housing shell
12 Housing cover
14 Flange
16 Stator
18 Stator body
20 Phase windings
22 Rotor
24 Shaft
26 Rotor magnet
28 Back iron yoke
30, 32 Roller bearings
34 Flange
36 Cable duct
38, 40 Leads
42 Sensor PCB 44 Signal producing device
48 Supporting component
50 Membrane
52 Motor cavity
54 Pressure equalizing cavity
56, 58 Grooves
57 Hole
59 Radial shaft seal
60 Ribs
62 Sealing ring
64 Stuffing box

What is claimed is:

1. A motor housing for an electric motor comprising a housing (10) that accommodates the electric motor, and a flexible partition (50); the flexible partition (50) positioned between the housing (10) and a housing cover (12) and providing a pressure equalizing cavity (54), whereby the pressure equalizing cavity (54) is connected to the outside environment via the housing cover (12) and whereby the flexible partition (50) acts to seal the housing (10) from the outside environment.

2. The motor housing according to claim 1, wherein the flexible partition (50) is a membrane.

3. The motor housing according to claim 1, wherein at least two openings (56, 58) are formed in the housing cover (12) to connect the pressure equalizing cavity (54) to an outside environment.

4. The motor housing according to claim 3, wherein the openings (56, 58) are grooves or holes in the housing cover.

5. The motor housing according to claim 1, wherein the flexible partition (50) forms a seal between the housing shell (10) and the housing cover (12).

6. The motor housing according to claim 1, wherein the housing cover (12) features means (60) for guiding the flexible partition (50) when the partition (50) is distorted.

7. The motor housing according to claim 1, further comprising a cable duct (36) disposed between the housing shell (10) and the housing cover (12).

8. The motor housing according to claim 7, wherein the cable duct holds leads (38, 40) for connecting the electric motor and that the flexible partition (50) forms a seal between the cable duct (36) and the housing shell (10) and/or the housing cover (12).

9. The motor housing according to claim 7, wherein the flexible partition (50) forms a seal between the cable duct (36) and at least one of the housing shell (10) or the housing cover (12).

10. The motor housing according to claim 1, wherein the flexible partition (50) further comprises a semi-permeable membrane.

11. An electric motor having a stator (16) and a rotor (22) which is enclosed in a motor housing (10) according to claim 1.

12. A motor housing comprising a first chamber (52) for receiving an electromagnetic rotor and a second chamber (54) for compensating for the temperature changes between the inside of the motor and ambient, wherein the second chamber communicates with the ambient via grooves in the housing cover.

13. The motor housing of claim 12, wherein the first chamber and the second chamber are separated by a flexible membrane.

14. The motor housing of claim 13, wherein the flexible membrane is an elastomer.

15. The motor housing of claim 12, wherein the first chamber is substantially sealed from the ambient.

16. The motor housing of claim 12, wherein the flexible portion is clamped between the first and the second chambers.

17. The motor housing of claim 12, wherein the second chamber further comprises at least one opening, the opening providing fluid communication between the second chamber and the ambient.

18. The motor housing of claim 12, wherein the second chamber further comprises a guide means for addressing distortion in the flexible membrane.

19. An electromagnetic motor comprising a housing, a rotor and a stator coupled to the housing;

the housing having a membrane defining a first section (52) and a second section (54), the first section (52) hermetically sealed from an ambient pressure by the membrane and the second section (54) in fluid communication with the ambient, the housing having a guide (60) adapted to allow a portion of the membrane to flex.

20. The electromagnetic motor of claim 19, wherein the membrane expansively deflects in response to a change of temperature in the first section of the housing.

21. The electromagnetic motor of claim 20, wherein the guide restores the flexible membrane after expansion.

22. The electromagnetic motor of claim 19, wherein the membrane is interposed between the first and the second sections.

23. The electromagnetic motor of claim 19, wherein membrane sealingly adjoins the first and the second sections.

24. A method of compensating for temperature changes within an electric motor comprising:

providing a housing defining a chamber for receiving a rotor and a stator;

dividing the chamber into a first section (52) and a second section (54) with a flexible membrane;

hermetically sealing the first section (52) with the flexible membrane;

coupling a cover to at least partially shield the flexible membrane, the cover providing a means to communicate pressure in the second section (54) with an ambient environments; and reflecting guiding the flexible membrane in a direction responsive to a temperature difference between the first section (52) and the second section (54).

25. The method of claim 24, wherein the membrane is an elastomer.

26. The method of claim 24, further comprising the step of providing means to communicate electricity to the housing.

27. A housing assembly for an electromagnetic motor comprising:

a chamber defined by said housing assembly for receiving a rotor and stator; and a flexible membrane dividing said chamber into a first portion (52) and a second portion (54), wherein said first portion (52) is hermetically sealed by said flexible membrane and said second portion (54) is in pressure communication with an ambient pressure, and wherein said flexible membrane elastically expands in response to a temperature change within said first portion (52).

28. The housing assembly of claim 27, further comprising a guide for restoring the flexible membrane after expansion.

* * * * *